United States Patent
Kloeb et al.

(10) Patent No.: US 8,137,607 B2
(45) Date of Patent: Mar. 20, 2012

(54) PROCESS FOR MAKING REUSABLE TOOLING

(75) Inventors: James Todd Kloeb, Armada, MI (US); Harold Sears, Livonia, MI (US); Lawrence E. Ellis, Dearborn Heights, MI (US)

(73) Assignee: Ford Motor Company, Dearborn, MI (US)

( * ) Notice: Subject to any disclaimer, the term of this patent is extended or adjusted under 35 U.S.C. 154(b) by 1421 days.

(21) Appl. No.: 11/557,203

(22) Filed: Nov. 7, 2006

(65) Prior Publication Data
US 2008/0105996 A1    May 8, 2008

(51) Int. Cl.
B28B 1/14    (2006.01)
(52) U.S. Cl. .......... 264/306; 164/7.2; 164/160.2
(58) Field of Classification Search .......... 264/308; 164/7.2, 160.2
See application file for complete search history.

(56) References Cited

U.S. PATENT DOCUMENTS

| | | | | |
|---|---|---|---|---|
| 4,043,376 A * | 8/1977 | Kasai et al. | | 164/7.2 |
| 4,050,500 A * | 9/1977 | Steinbacher | | 164/16 |
| 4,157,109 A * | 6/1979 | Toyoda et al. | | 164/7.2 |
| 4,632,171 A * | 12/1986 | Almond | | 164/255 |
| 5,182,170 A * | 1/1993 | Marcus et al. | | 264/497 |
| 5,204,055 A * | 4/1993 | Sachs et al. | | 419/2 |
| 5,387,380 A * | 2/1995 | Cima et al. | | 264/69 |
| 5,718,279 A * | 2/1998 | Satoh et al. | | 164/456 |
| 6,638,460 B1 * | 10/2003 | Wahl | | 264/154 |
| 2004/0031580 A1 * | 2/2004 | Smith | | 164/4.1 |
| 2005/0167872 A1 * | 8/2005 | Tsubaki et al. | | 264/113 |
| 2005/0269055 A1 * | 12/2005 | Frasier et al. | | 164/361 |

FOREIGN PATENT DOCUMENTS
WO    01/68336 A2    9/2001
WO    2004/110719 A2    12/2004

OTHER PUBLICATIONS

Manufacturing with 3DP, Examples of Casting, Composites and Thermal Spray, B. Lyons, Society of Manufacturing Engineers Technical Paper, TP06PUB2, pp. 1-11, Nov. 16, 2006.
Z Corporation—Rapid Metal Casting Solutions, http://www.zcorporation.com/products/zcast.asp ZCast® Direct Metal Casting, Nov. 16, 2006.
Z-Corporation—Spectrum Z™510 System, Next-Generation High-Definition Color 3D Printing System http://www.zcorporation.com/products/printersdetail.asp?ID=2, Nov. 16, 2006.
Z-Corporation—ZPrinter®310 Plus, Fast, Affordable 3D Printing System http://www.zcorporation.com/products/printersdetail.asp?ID=1, Nov. 16, 2006.
Z-Corporation—Frequently Asked Questions—Questions? We have the answers. http://www.zcorporation.com/products/zcastfaq.asp, Nov. 16, 2006.
Search Report under Section 17(5) for GB0717622.5 dated Jan. 7, 2008.

* cited by examiner

*Primary Examiner* — Joseph Del Sole
*Assistant Examiner* — David N Brown, II
(74) *Attorney, Agent, or Firm* — Raymond L. Coppiellie; Brooks Kushman P.C.

(57) ABSTRACT

A reusable, low investment tool for making parts is made by a process in which a mixture of sand and an activator is applied as a layer onto which a printed resin is deposited to form a base and a pattern. A plurality of sidewalls may also be provided on the base using the same process. The tool is coated with a curable resin to form a protective shell. The reusable tool may be used as a dump box or as a vacuum forming tool for forming parts. A stamping die may be formed by drawing a vacuum through the sand layer as the resin coating is applied to more fully permeate the stamping die.

12 Claims, 2 Drawing Sheets

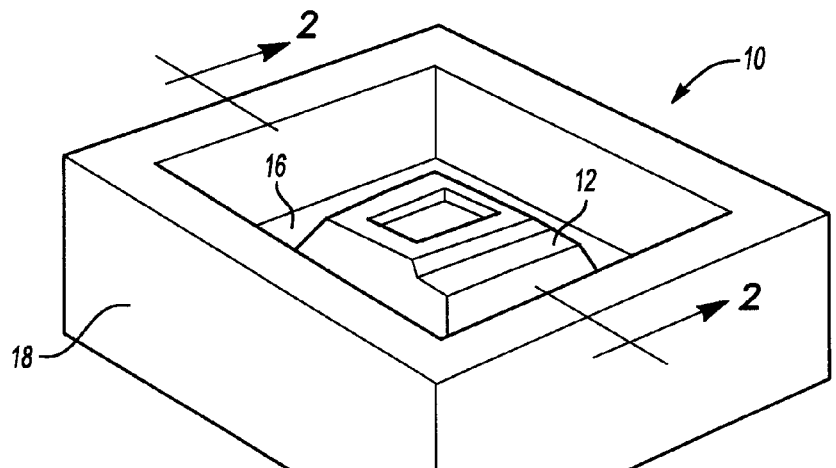
Fig-1
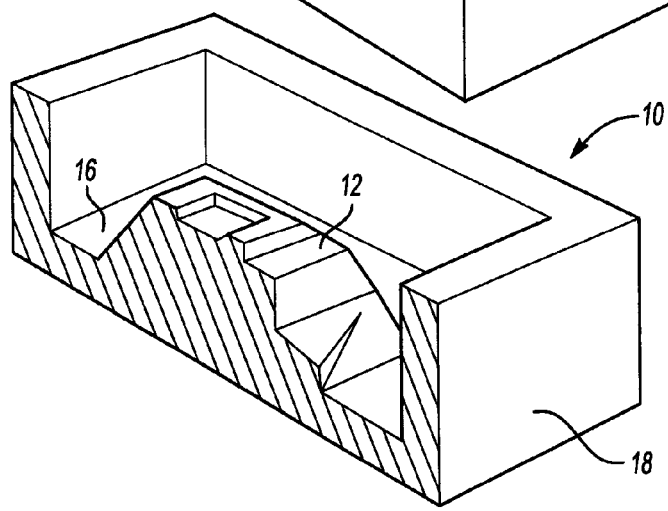
Fig-2
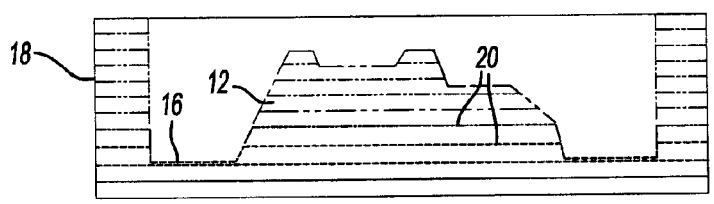
Fig-3
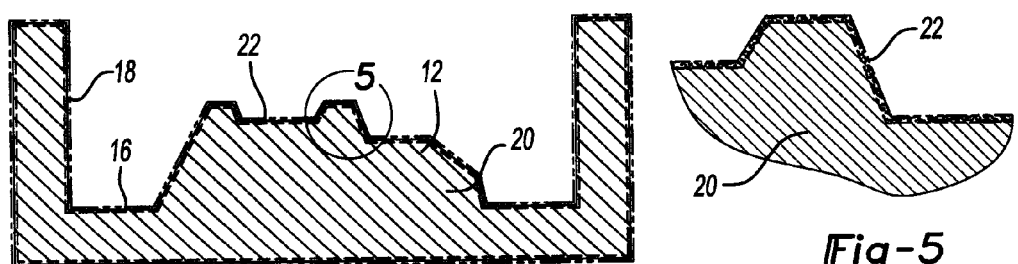
Fig-4
Fig-5

8,137,607 B2

PROCESS FOR MAKING REUSABLE TOOLING

BACKGROUND OF THE INVENTION

1. Field of the Invention

The present invention relates to a reusable tool for making parts and a method of making reusable tooling for producing sand castings, sheet metal dies, and for producing vacuum formed parts.

2. Background Art

Prototype tooling is used for low volume production of prototypes. Prototype parts are manufactured to permit testing and evaluation of the prototype parts prior to releasing the part for manufacture. There is a need for reusable tooling for making prototypes if more than one prototype part is to be made. For some parts, twenty or more prototypes may be needed for evaluation and testing purposes. The per piece cost of prototype tooling is relatively expensive due to the low number of parts over which the cost of the tooling may be amortized. There is a need for reusable prototype tooling that can be manufactured without adding excessive costs to the prototype tooling.

Conventional prototype tooling for cope and drag dump boxes generally include a pattern that may be formed of wood or REN board that is cut or CNC machined to the desired pattern shape. The pattern is then assembled to a REN board box.

Recent developments relating to rapid casting technology have led to the development of sand and resin printing machines that can print a three-dimensional pattern by sequentially layering a sand and activator mixture and a printed resin according to CAD data for a prototype part. A pattern may be printed in this manner and assembled to a REN board box to form cope and drag dump boxes for making prototype parts. A problem with this approach is that substantial expense and delay are incurred relating to the assembly of the pattern to the separately fabricated REN board box.

The use of rapid casting technology to produce three-dimensional patterns is normally limited to a single use but in some cases the patterns may be used a few times. However, the patterns are not durable and may suffer from breakage or wear resulting in the loss of surface finish and dimensional accuracy if a rapid casting three-dimensional model is used multiple times.

There is a need for reusable prototype tooling such as cope and drag boxes that may be used in making prototype sand castings for foundries. Prototype sand castings may be made from sections of a mold that are assembled as a sand casting mold assembly for producing the prototype part.

There is a need for a more cost effective method of making a stamping die for stamping prototype parts in a fluid press.

There is also a need for more cost effective reusable tooling for making plastic parts in a vacuum forming process. For example, machined vacuum form tools are known to be used to manufacture plastic prototype trim parts such as lenses for lights. A reusable tool for making a vacuum formed plastic prototype part that does not require extensive machining or assembly to REN supporting structures is not known to be available in the prior art.

The above problems and needs are addressed by applicants' invention as summarized below.

SUMMARY OF THE INVENTION

According to the present invention, a reusable tool is provided for making parts. The tool comprises a base wall that is formed by a plurality of layers of foundry sand to which a resin binder is applied. A pattern of a part is formed on the base by a plurality of layers of the foundry sand and the resin binder. A coating that forms a low viscosity resin shell is applied to and penetrates substantially all of the surfaces of the base wall and the pattern.

According to another aspect of the invention, the reusable tool may further comprise a box defined by a plurality of side walls that extend from the base. The side walls are formed by the plurality of layers of sand and activator mixture to which the resin binder is applied. The box may be used in a process in which the tool is filled with sand and a no bake binder to form a portion of a sand casting tool that is removed after hardening and assembled with other portions of the sand casting tool.

According to other aspects of the invention as they relate to the reusable tool, a plurality of holes may be provided in a forming surface of the pattern that extend through the coating from the forming surface to the layers of sand and printed resin. The tool may also further comprise a source of vacuum pressure and at least one port in the base that extends through the coating to provide vacuum pressure to the layers of sand and printed resin. A sheet of thermoplastic material may be heated and placed on the pattern with a vacuum being drawn through the layers of sand and printed resin and through the holes in the forming surface of the pattern to form the sheet into a part.

According to other aspects of the invention as they relate to reusable tool, the low viscosity resin is a reactive resin that is generally a two part resin system. For example, the absorbed resin shell may comprise a two part polyurethane resin, a two part epoxy resin, a two part acrylic resin, or a two part polyester resin.

According to another aspect of the present invention, a method is provided for making cope and drag boxes for parts. According to the method, a plurality of resin layers and a plurality of foundry sand layers are printed to form a base, a plurality of side walls, and a pattern for at least a portion of a part. The base, side walls and pattern may be coated with a resin that is allowed to penetrate to a depth of more than one millimeter. The resin is cured to form a shell that is absorbed into the base, side walls and pattern.

The method may further comprise filling the cope and drag boxes with a mixture of sand and binder, and curing the mixture of sand and binder to form a casting mold.

According to another aspect of the invention, a method is provided for making a stamping die for a fluid cell press. The method comprises depositing a plurality of layers of foundry sand and activator mixture and applying a printed resin to each layer to form the stamping die. The stamping die is coated with a penetrating resin. A vacuum is drawn through the plurality of layers of foundry sand to draw the penetrating resin through the plurality of layers of foundry sand to a depth of more than one millimeter. The penetrating resin is cured after the resin is absorbed into the stamping die.

According to another aspect of the invention, the step of drawing the resin through the plurality of layers of foundry sand may be continued until the stamping die is permeated.

According to another aspect of the present invention, a method of making a part is provided that comprises sequentially layering resin and foundry sand to form a base wall and a pattern on the base wall. A shell of curable resin is applied to the base wall and pattern. The pattern is then used to form a part.

The method of making a part may further comprise drilling holes in the pattern through the shell through which a vacuum may be drawn. At least one vacuum port may be formed in the base through which a source of vacuum pressure is ported to the base wall. A blank of thermoplastic material may then be loaded onto the pattern. The blank of thermoplastic material is heated to soften the blank and is then vacuum formed to the pattern.

Alternatively, the method may further comprise forming a plurality of sidewalls on the base to form a pattern box during the step of sequentially applying a layer of a mixture of sand and an activator and applying a printed resin to the mixture. The method of making a part may further comprise filling the pattern box with sand and a binder resin, curing the resin to form at least a part of a sand casting mold, and using the pattern in a casting process. The method may further comprise providing two pattern boxes by repeating the steps of sequentially layering, forming a shell and using the pattern boxes as cope and drag boxes by filling the assembled cope and drag boxes with sand and resin. The resin is then cured and used to form the sand casting mold.

While the present invention has particular application to the making of prototype parts, the invention should be understood to be also relevant to the manufacture of other types of parts that may not be prototype parts. For example, parts having a limited production run may also be made according to the invention.

These and other aspects of the present invention will be better understood by one of ordinary skill in the art in view of the attached drawings and the following detailed description of the illustrated embodiments.

BRIEF DESCRIPTION OF THE DRAWINGS

FIG. 1 is a perspective view of a cope box or drag box made according to the present invention;

FIG. 2 is a perspective cross-sectional view taken along line 2-2 in FIG. 1;

FIG. 3 is cross-sectional view taken along the line 2-2 in FIG. 1;

FIG. 4 is a diagrammatic cross-sectional view similar to FIG. 3 diagrammatically showing a coating applied to the outer surfaces thereof;

FIG. 5 is a magnified view of a portion of FIG. 4 within circle 5;

DETAILED DESCRIPTION OF THE PREFERRED EMBODIMENT(S)

Figure 6:
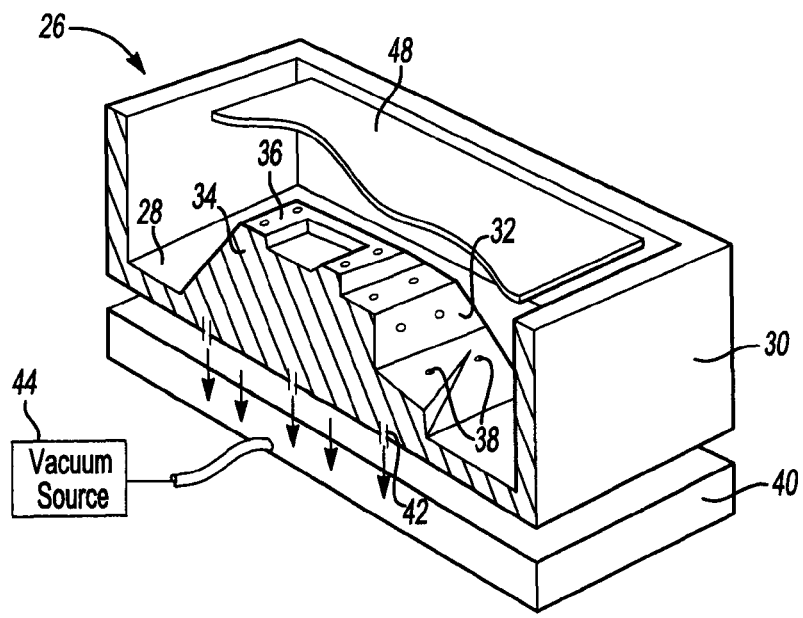
FIG. 6 is a perspective cross-sectional view diagrammatically illustrating a vacuum forming tool embodiment of the present invention.

Referring to FIGS. 1 and 2, a reusable tool, in this illustration a cope dump box or a drag dump box (hereinafter a "dump box"), includes a pattern 12. The pattern 12 is formed on a base 16 of the tool 10. A plurality of side walls 18 extend upwardly from the base 16. The reusable tool 10, or a dump box, is a unitary construction meaning that the pattern, base and walls are all formed as a unit.

The dump box 10 defines a cavity in which foundry sand and no bake mix binder are compacted. The binder is permitted to harden, after which the sand and hardened resin are dumped out of the box and used to build a sand cast mold as is well known in the art.

Referring to FIG. 3, the reusable tool is illustrated diagrammatically to show that it is built in a layered fashion using a rapid prototyping process. The layers 20 are formed by first applying a layer of sand that includes an activator and then printing resin with an ink jet printing head that is similar to an ink jet printer. The sand and resin binder layers 20 are initially built up to form the base 16. The sand and activator mixture is initially applied across the length and width of the base 16 and then the resin is printed thereon until a base of sufficient thickness is developed. The process continues with the side walls 18 and pattern 12 being built up layer by layer on the base 16. The side walls 18 and pattern 12 are formed integrally with the base 16 by applying additional layers of the sand and binder resin layers 20 until the pattern 12 and side walls 18 are fully formed.

Referring to FIGS. 4 and 5, the reusable tool 10 is shown with a resin coating 22 applied on all of the surfaces of the pattern 12, base 16 and side walls 18. The resin shell 22 may be a two part reactive resin. Examples of suitable resin may include but are not limited to epoxy, polyurethane, acrylic or polyester based reactive resin systems. The resin shell 22 is preferably a low viscosity resin shell to facilitate absorption of the resin coating 22 into the sand and binder resin layers 20. The resin coating 22 preferably penetrates the sand and binder resin layers 20 to a thickness of from about one to three millimeters to provide a durable shell on all of the external surfaces of the tool 10. The resin shell 22 adds strength, rigidity, and durability to the sand and binder resin layers 20 to protect them from damage thereby facilitating reuse of the tool 10.

Figure 7:
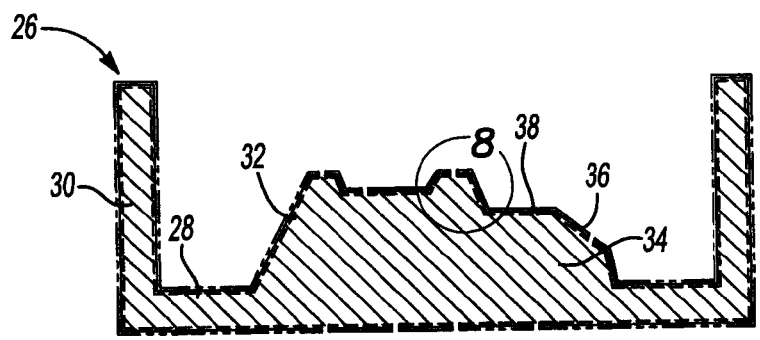
FIG. 7 is a cross-sectional view of the embodiment of FIG. 6.
Figure 8:
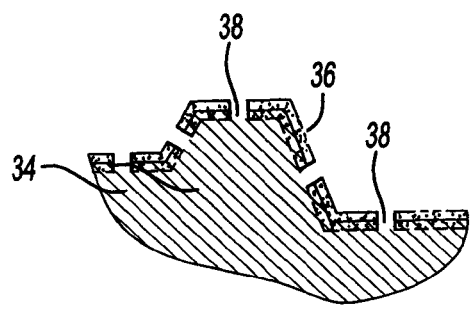
FIG. 8 is a magnified view of the portion of FIG. 7 shown within circle 8.

Referring to FIGS. 6 through 8, a reusable tool 26, in this case a vacuum forming tool, is formed in a similar process to the embodiment of FIGS. 1 through 5. A base 28 is formed in conjunction with a pattern 32. The base 28 and pattern 32 are formed by sequentially layering sand and printed resin layers 34 as previously described with reference to FIGS. 1 through 5. The sand and printed resin layers 34 are applied according to computer aided design instructions. A forming surface 36 is provided on the pattern 32 that defines the desired shape of the part to be formed on the tool 26.

Vacuum holes 38 are provided in areas of the forming surface 36 preferably in corners or areas that are trimmed off of the finished part. Vacuum is drawn through the vacuum holes 38. The tool 26 may be placed on a vacuum table 40 that draws a vacuum through vacuum ports 42 formed in the base 28. The vacuum table 40 either includes or is connected to a vacuum source 46 that draws a vacuum through the vacuum ports 42, sand and printed resin layers 34 and vacuum holes 38. The sand and printed resin layers 34 are porous which allows the vacuum to be drawn through the sand and printed resin layers 34. The vacuum holes 38 and vacuum ports 40 are formed through the resin coating 36.

When the tool 26 is used in a vacuum forming operation, a plastic sheet 48 is heated and then placed on the pattern 32. Vacuum is drawn by the vacuum source 44 through the vacuum ports 42 in the vacuum table 40. Vacuum is drawn through the sand and printed resin layers 34 and the vacuum holes 38 in the resin coating 36 to form a plastic part having the shape of the pattern 32.

A stamping die can be made by printing it on a 3D printer such as a rapid casting technology machine using typical foundry sand. Once the stamping die is printed and cleaned of loose sand it can be substantially fully infiltrated with a low viscosity resin (epoxy, urethane, acrylic, etc.) by pulling this resin through the part using vacuum pressure that is provided by a vacuum table. In this case, the resin infiltrates the part to a greater extent than for the vacuum forming tool. The low viscosity resin may fully permeate the stamping die due to the part's inherent permeability. The resin fills the spaces between the sand particles making the stamping die very hard and tough to withstand the forming pressures typically encountered in a fluid cell press. In contrast, in the sand casting tool and vacuum forming tool as described above, the resin penetrated about 1 mm of the surface to gain the strength required for its intended purpose (vacuum forming tools or dump boxes). This vacuum assisted process used to make a stamping die is dependent on resin viscosity and vacuum pressure. Lower viscosity resins and higher vacuum pressures perform more compete infiltration. Since resin is expensive and filler is inexpensive, the stamping die is preferably composed of a vast majority of filler (sand) and a much smaller amount of resin in comparison to a conventionally cast stamping die that is made with a filled resin.

While the best mode for carrying out the invention has been described in detail, those familiar with the art to which this invention relates will recognize various alternative designs and embodiments for practicing the invention as defined by the following claims.

What is claimed is:

1. A reusable tool for making parts comprising:
   a base wall formed by a plurality of layers of foundry sand to which a resin binder is applied;
   a box defined by a plurality of side walls that extend from the base, the side walls are formed by a plurality of layers of a foundry sand to which a resin binder is applied;
   a pattern of a part formed on the base by a plurality of layers of foundry sand to which a resin binder is applied; and
   a coating of a low viscosity resin shell applied to all surfaces the base wall, the box and the pattern that penetrates the surfaces to a limited depth.

2. The reusable tool of claim 1 wherein the box is filled with sand and a no bake binder to form a portion of a sand casting tool that is removed after hardening and assembled with other portions of the sand casting tool.

3. The reusable tool of claim 1 further comprising a plurality of holes in a forming surface of the pattern that extend through the coating from the forming surface to the layers of sand and printed resin binder.

4. The reusable tool of claim 3 further comprising a source of vacuum pressure and at least one port in the base that extends through the coating through which the source of vacuum pressure provides vacuum pressure to the layers of sand and printed resin.

5. The reusable tool of claim 4 wherein the tool is used in a vacuum forming process in which a sheet of thermoplastic material is heated and placed on the pattern and vacuum is drawn through the layers of sand and printed resin and through the holes in the forming surface of the pattern to form the sheet into a part.

6. The reusable tool of claim 1 wherein the low viscosity resin shell is a two part reactive resin.

7. A method of making a stamping die for a fluid cell press comprising:
   depositing a plurality of layers of foundry sand and an activator mixture and applying a printed resin to each layer to form the stamping die;
   coating the stamping die with a penetrating resin;
   drawing a vacuum through the plurality of layers of foundry sand and drawing the penetrating resin through the plurality of layers of foundry sand to a depth of more than one millimeter; and
   curing the penetrating resin after the resin is absorbed into the stamping die.

8. The method of claim 7 wherein the step of drawing the resin through plurality of layers of foundry sand is continued until the stamping die is permeated.

9. A method of making a part comprising:
   sequentially applying a layer of a mixture of sand and an activator and applying a printed resin to the mixture to form a base wall, a plurality of side walls on the base wall and a pattern on the base wall to form a dump box;
   forming a shell of curable resin on the base wall, side walls and pattern; and
   using the dump box to form the part.

10. The method of claim 9 further comprising drilling holes through which a vacuum may be drawn in the pattern and through the shell, forming at least one vacuum port in the base through which a source of vacuum pressure is ported to the base wall, and loading a blank of thermoplastic material into the pattern, heating the blank of thermoplastic material to soften the blank, and vacuum forming the blank to the pattern.

11. The method of claim 9 wherein the step of using the pattern further comprises filling the dump box with sand and a no bake binder, curing the no bake resin to form at least one part of a sand casting mold.

12. The method of claim 11 wherein the dump box is a cope box, the method further comprising providing a drag box by repeating the steps of sequentially layering, forming a shell, and using the cope box and drag box by filling the cope box and the drag box with sand and no bake resin, curing the no bake resin to form the sand casting mold.

* * * * *